United States Patent [19]
Moore et al.

[11] 3,778,086
[45] Dec. 11, 1973

[54] MUD FLAP MOUNTING MEANS
[76] Inventors: Peter N. Moore; Leo F. Pierce, both of 117 S.W. 23, Oklahoma City, Okla. 73109
[22] Filed: Sept. 12, 1972
[21] Appl. No.: 288,477

Related U.S. Application Data
[63] Continuation-in-part of Ser. No. 116,775, Feb. 19, 1971, Pat. No. 3,700,260.

[52] U.S. Cl. .................................. 280/154.5 R
[51] Int. Cl. ............................... B62d 25/18
[58] Field of Search ..................... 280/154.5 R

[56] References Cited
UNITED STATES PATENTS
3,285,624  11/1966  Aber ........................... 280/154.5 R
3,219,363  11/1965  Dalsey ......................... 280/154.5 R
3,158,386  11/1964  Tillinghast .................... 280/154.5 R

*Primary Examiner*—Robert R. Song
*Attorney*—Robert K. Rhea

[57] ABSTRACT

Spring urged clamp means, connected with a vehicle rearward support, grips the upper edge portion of a mud flap and supports it in combination with pins extending through the mud flap. Downwardly directed stress impressed on the depending portion of the mud flap opens the clamp means to release the mud flap.

2 Claims, 6 Drawing Figures

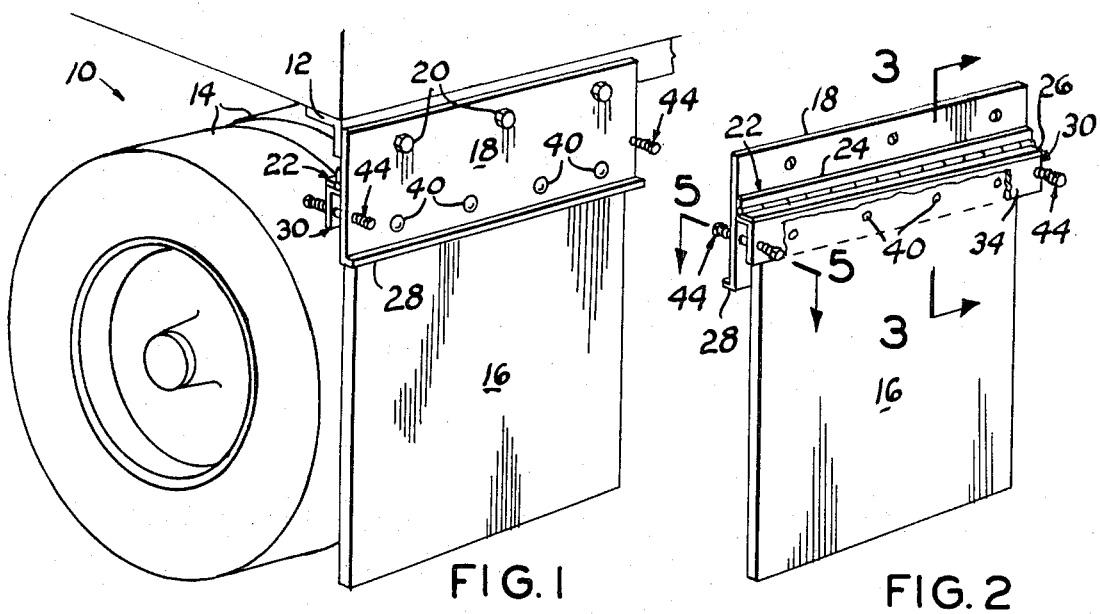
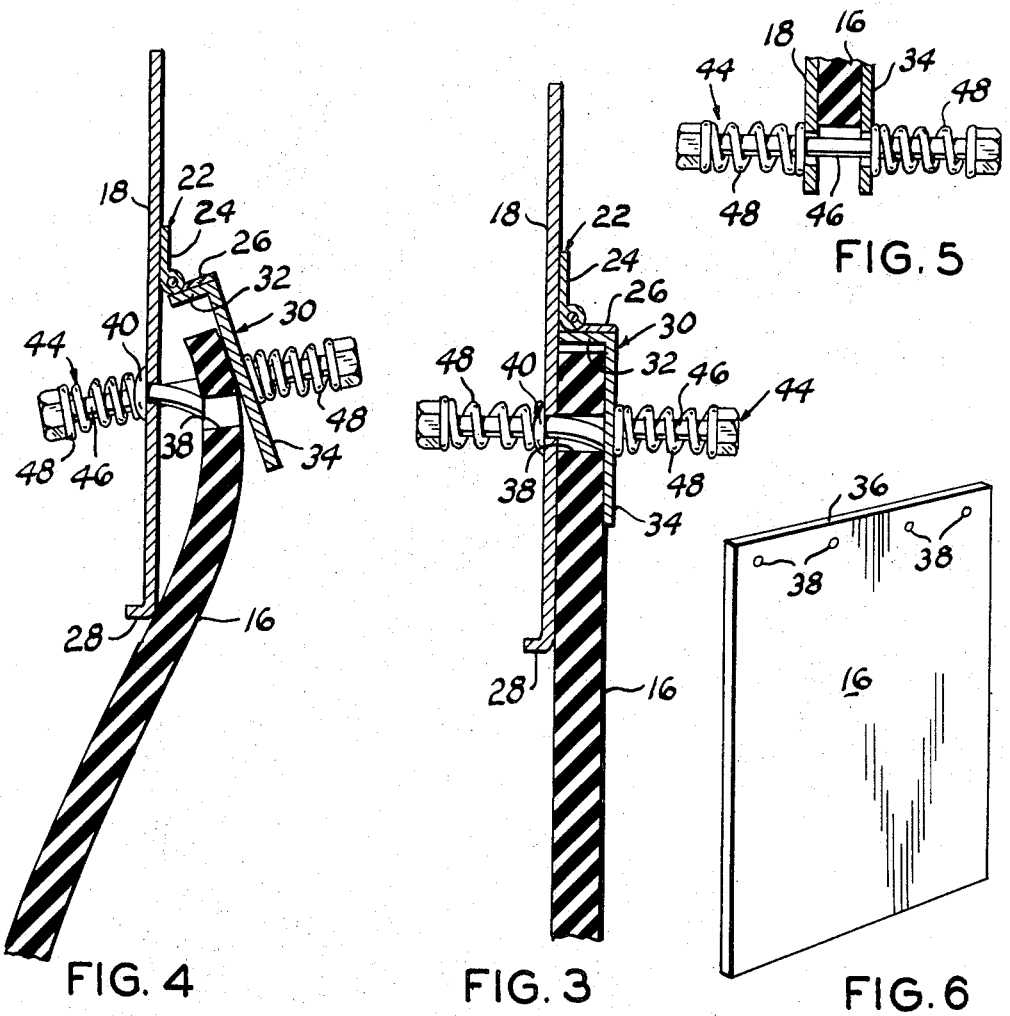

MUD FLAP MOUNTING MEANS

CROSS REFERENCE TO RELATED APPLICATION

The present invention is a continuation-in-part of an application filed by us in the United States Patent Office on Feb. 19, 1971, Ser. No. 116,775, now U.S. Pat. No. 3,700,260, for Mud Flap And Mounting Means.

BACKGROUND OF THE INVENTION

1. Field of the Invention

The present invention relates to mud flaps for trucks and more particularly to a mounting means releasably connecting the mud flap to the truck.

The principle distinction between this invention and the device disclosed by the above referred to application is the manner in which a mud flap holding clamp cooperates with mud flap supporting pins in releasably supporting a conventional mud flap.

In most States it is a requirement that trucks be provided with mud flaps which are mounted in a vertical depending position rearwardly of the rear wheels of trucks and trailers. This is primarily a safety requirement so that muddy water, rocks, and the like, picked up and thrown by the wheels of the truck or trailer impinge on the mud flap. Under certain conditions of normal operation these mud flaps are damaged and in some instances torn away necessitating their replacement. This frequently happens by the truck or trailer being backed to position it at a loading dock wherein the rear wheels impinge the mud flap against a fixed support so that the mud flap is torn or damaged and in some instances torn away from its support on the vehicle. Mud flaps are normally bolted to a support on the vehicle and are not easily replaced by the driver while making a trip.

2. Description of the Prior Art

The most pertinent patents of which we are aware are the ones to Tillinghast et al. U.S. Pat. No. 3,158,386 and Dalsey et al. U.S. Pat. No. 3,219,363. The mud flap clamp means of each of these patents is intended to be used with a mud flap formed for cooperation with the particular clamp means.

This invention, on the other hand, provides a mounting means for the use of existing mud flaps for releasable mounting so that they may be easily repositioned each time they are pulled off of the truck.

SUMMARY OF THE INVENTION

A mounting or base plate is vertically secured to a rearward transverse support of the vehicle rearwardly of the rear wheel position. A hinge is transversely secured to the depending edge portion of the mounting plate. One movable portion of a clamp means is secured to the depending flap or leaf of the hinge. The other portion of the clamp means is formed by the depending portion of the base plate. The movable clamp portion is normally urged toward the base plate in a cooperating mud flap edge gripping position by spring and bolt means. Spaced-apart pins secured to the base plate enter similarly spaced apertures formed adjacent one end of a mud flap to releasably support the mud flap.

The principle object of this invention is to provide an apparatus for connecting conventional mud flaps to trucks which will release the mud flap in a replaceable break-away fashion when the mud flap is under stress.

BRIEF DESCRIPTION OF THE DRAWINGS

FIG. 1 is a fragmentary perspective view of a trailer having the device installed thereon;

FIG. 2 is a perspective view of the device and mud flap, with parts broken away for clarity, rotated substantially 180° about a vertical axis from its position in FIG. 1;

FIG. 3 is a fragmentary vertical cross-sectional view, to a larger scale, taken substantially along the line 3—3 of FIG. 2;

FIG. 4 is a fragmentary vertical cross-sectional view similar to FIG. 3 illustrating the position of the movable portion of the clamp means when releasing or installing a mud flap;

FIG. 5 is a fragmentary horizontal cross-sectional view, partially in elevation, taken substantially along the line 5—5 of FIG. 2; and, FIG. 6 is a perspective view of a substantially conventional mud flap.

DESCRIPTION OF THE PREFERRED EMBODIMENT

Like characters of reference designate like parts in those figures of the drawings in which they occur.

In the drawings:

The reference numeral 10 indicates the rearward end portion of a trailer having a horizontal support 12 positioned above and rearwardly of wheels 14 to which a mud flap 16 is normally connected in depending relation. The numeral 18 indicates a rectangular base plate which is secured to the support 12 as by bolts 20 or by welding the base plate to the support 12. The base plate 18 depends vertically from the support 12 a selected distance. Hinge means, such as a piano hinge 22, having oppositely directed hinge leaves 24 and 26 has its hinge leaf 24 secured to the forward surface of the base plate 18 by any suitable means, such as spot welding, not shown, intermediate the vertical extent of the base. Obvious other type hinge means may be used, if desired.

A mud flap movable clamp member 30 cooperates with the forward surface of the base 18 to form a mud flap clamp. The clamp member 30 is substantially inverted L-shaped in cross section having its foot portion 32 secured to the hinge leaf 26 thus disposing its leg portion 34 in a depending position. The transverse dimension of the foot portion 32 is at least equal with the thickness of the mud flap 16.

The distance between the longitudinal axis of the hinge pin of the piano hinge 22 and the depending edge 28 of the base plate is preferably substantially greater than the vertical extend of the clamp member leg 34 as clearly illustrated in FIGS. 3 and 4. The length of the base 18 and clamp member 30 is preferably slightly greater than the width of the mud flap 16 for the purposes presently apparent.

The mud flap 16 is conventional and comprises a rectangular section of flexible material, usually formed of reinforced rubber, or the like. Adjacent one of its ends, for example the end 36, the mud flap 16 is conventionally provided with a plurality of apertures 38 for normally receiving bolts, not shown, and bolting the mud flap to the trailer.

A like plurality of similarly spaced-apart bolt-like pins 40 are secured to the base plate 18 in forwardly equidistant projecting relation. The pins 40 are preferably arcuately bowed downwardly so that their free end surface contacts the surface of the clamp leg 34, intermediate its vertical extent, facing the base 18 when the leg 34 is disposed parallel with the base. The depending portion of the base, projecting downwardly beyond the depending limit of the clamp leg 34, assists in preventing a rearward sailing action of the mud flap as a result of wind resistance against the mud flap during forward movement of the truck.

The clamp member 30 is maintained in gripping relation with respect to the mud flap by resilient means 44. The resilient means 44 comprises a bolt 46 which extends horizontally through suitable apertures cooperativly formed in respective opposing end portions of the clamp member 30 and base medially the vertical extent of the clamp leg 34. A pair of helical springs 48 surround the respective end portions of the bolt 46 projecting beyond the clamp member 30 and base 18 and normally biases the movable clamp member 30 toward the base 18 in mud flap end portion clamping relation.

OPERATION

In operation the base plate 18, having the clamp member 30 hingedly connected therewith, is connected to the support 12 as described hereinabove. The apertured end portion of the mud flap is positioned between the clamping member 30 and the base 18 with the pins 40 surrounded by the mud flap apertures 38, as described hereinabove, thus supporting the mud flap. When the truck is backed toward a receiving dock, or the like, not shown, and the mud flap contacts a vertical edge portion of the dock, the wheels 14 impinge the mud flap between a portion of their periphery and the wall of the dock so that a downwardly directed stress is imparted to the mud flap and pulls the mud flap downwardly off of the pins 40. This action is permitted by the movable clamp member 30 pivoting about the horizontal axis formed by the pin of the hinge 22 (FIG. 4). This action releases the mud flap 16 without damage thereto. The driver may thereafter replace the released mud flap or buy a new mud flap if the original one is lost, by manually moving the movable clamp member 30 to the position illustrated in FIG. 4 for inserting the apertured end portion of the mud flap.

Obviously the invention is susceptible to changes or alterations without defeating its practicability, therefore, we do not wish to be confined to the preferred embodiment shown in the drawings and described herein.

We claim:

1. A support and holder for a mud flap having a plurality of apertures adjacent one end portion thereof, comprising:
    a base plate adapted to be transversely secured to a vehicle surface rearwardly of the wheel position, said base plate having a depending edge;
    a movable clamp member hingedly mounted to the forward surface of said base plate for cooperative movement toward and away from said base for gripping said end portion disposed therebetween, said movable clamp member extending perpendicularly forward of said base plate and downwardly and terminating substantially above the plane of the depending edge of said base plate;
    a plurality of pins secured to said base for entering the apertures in said mud flap end portion, said pins extending downwardly toward and abutting the adjacent surface of said clamp member; and,
    spring means connected with said clamp member and said base at their respective lateral end portions beyond the lateral ends of said mud flap.

2. The support and holder according to claim 1 in which said spring means includes:
    a bolt extending through the respective end portions of said clamp member and said base and projecting beyond the respective forward and rearward limit thereof; and,
    a tension spring supported by the respective end portion of said bolts and normally biasing said movable clamp member toward said base.

* * * * *